T. H. JACOB.
MACHINE FOR WORKING IN ENGINE BEARINGS.
APPLICATION FILED JULY 19, 1917.
1,281,382.
Patented Oct. 15, 1918.
2 SHEETS—SHEET 2.
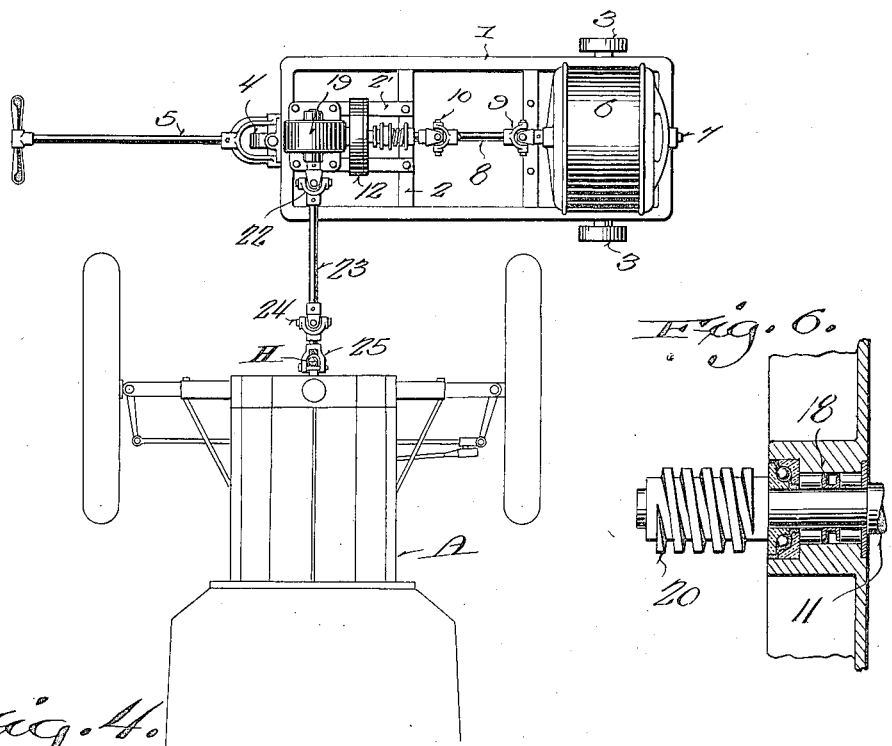
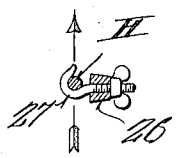
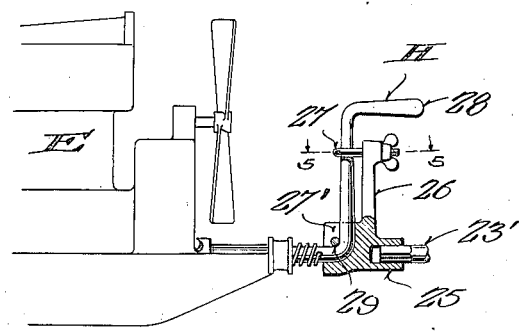

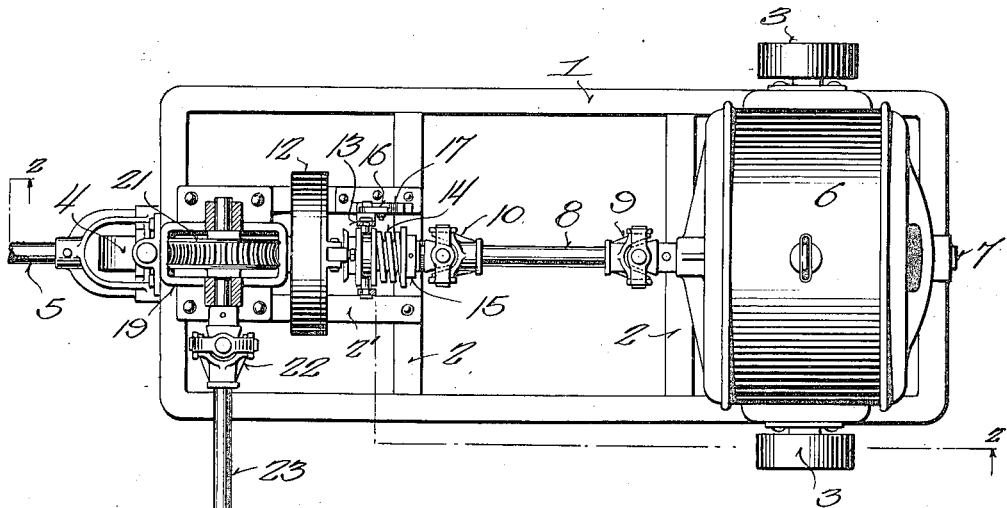

UNITED STATES PATENT OFFICE.

THOMAS H. JACOB, OF WAUSAU, WISCONSIN.

MACHINE FOR WORKING IN ENGINE-BEARINGS.

1,281,382.  Specification of Letters Patent.  Patented Oct. 15, 1918.

Application filed July 19, 1917. Serial No. 181,546.

*To all whom it may concern:*

Be it known that I, THOMAS H. JACOB, a citizen of the United States, and resident of Wausau, in the county of Marathon and State of Wisconsin, have invented certain new and useful Improvements in Machines for Working in Engine-Bearings; and I do hereby declare that the following is a full, clear, and exact description thereof.

My invention refers to means for working in the movable parts of automobile and other types of internal combustion engines without removing the same from the parts with which they are normally used.

It is well-known that, as a general rule, manufacturers of automobile and other internal combustion engines work in the movable parts thereof, such as the pistons and crank shafts, before the same are mounted. This working in process is procured by external means, while the parts of the engine are cold. In other words, it has been found to be more advantageous to actuate the parts of an internal combustion engine, which are in frictional engagement with each other, before permitting the same to operate under its own power, as in such instance the usual stiffness, which is prevalent in new machinery, is avoided.

Makers of automobile engines have adequate facilities for carrying out this working in process, but the usual machine shop operator or automobile mechanic does not have his shop equipped with any such facilities. Therefore, when he adds a new piston or a new crank shaft to an engine, the only way in which they can be properly fitted is by operating the engine under its own power.

It is, therefore, an object of the present invention to provide an apparatus which will be within the reach of almost every public garage owner and automobile repairer, and which will effectively work in the frictionally engaging parts of an automobile or other internal combustion engine, while the same is cold.

A further object of the invention is to provide an apparatus which will be portable in its nature so that it may be readily moved from place to place to operate upon engines without removing them from their usual resting places.

A minor object of the invention is to provide an arrangement in connection with the main parts of my machine for attaching the same to the crank of an ordinary automobile engine.

With the foregoing and other objects in view, the invention resides in the novel features of construction, combination and arrangement of parts, which will be hereinafter more particularly described and claimed, and shown in the drawings, wherein:

Figure 1 represents a plan view, partly in section, of a portable machine for carrying out the foregoing objects, the sectional parts of this view being taken on the plane of the line 1—1 of Fig. 2.

Fig. 2 is a vertical longitudinal sectional view on the line 2—2 of Fig. 1.

Fig. 3 is a plan view of my apparatus and the forward end of an automobile, said apparatus being attached to the operating crank of the latter.

Fig. 4 is a detail sectional view taken substantially on the plane of the line 4—4 of Fig. 1.

Fig. 5 is a similar view on the line 5—5 of Fig. 4, and

Fig. 6 is a detail sectional view on the plane of the line 6—6 of Fig. 2.

By reference to the several figures of the accompanying drawings, it will be seen that the invention consists of a suitable portable carriage in the form of a truck 1, a power plant mounted on said truck and means for transmitting motion from the power plant to the crank shaft of an internal combustion engine E, which forms a part of an automobile A. In plan view, the truck 1 is preferably rectangular and is composed of angle metal side and end bars, the side bars of which are suitably braced intermediate their ends by braces 2. The truck is movable readily from place to place on the wheels 3 and 4, the latter being disposed at the forward end of the truck frame and pivoted thereto for guiding the latter. Movement of the wheel 4 on its pivot is readily accomplished by means of the tongue 5 which is connected thereto.

Although the necessary source of power may be readily procured by any convenient means, that preferably employed consists of the electric motor 6, which is mounted on the truck frame 1 preferably over the wheels 3 and 4 and adjacent the end remote from that to which the tongue 5 is attached. The electric motor furnishes a very convenient source of power and one which is readily controllable when it is necessary that the movable parts of the engine E be operated slowly.

The shaft 7 of the motor 6 has a second shaft 8 connected thereto by a universal joint 9, said shaft 8 being similarly connected as at 10 with a clutch controlled shaft 11. The clutch 12 which is on this shaft 11 is of any conventional design, which is readily operable upon movement in the proper direction of a shifting lever 13. The lever is normally held in inoperative position to prevent operation of the clutch by means of a coiled expansion spring 14, which surrounds the shaft 11 and has one end engaging the lever and the other a collar 15 disposed thereon adjacent the second universal joint 10. When, however, it is necessary to allow the rotation of the operating portion of said shaft 11, the lever 13 is movable in a direction to cause the dog 16 thereof to engage a stop lug 17 formed on a bracket secured to the truck frame 1.

The operating part of the shaft 11 is journaled in a bearing 18, such as that shown in Fig. 6, which is carried by a combined bracket and gear casing 19, the latter being mounted upon the truck frame 1 by means of brace bars 2', as clearly shown in Fig. 1. The end of the shaft 11 within its gear casing has a worm 20 fixed thereto, which is continually in mesh with a worm gear 21 also disposed within the casing 19.

The shaft on which the worm gear 21 is mounted is connected by means of a universal joint 22 to a shaft 23 which is normally disposed substantially at right angles to the shafts 7, 8, and 11, and is designed to be directly connected with the crank shaft of an engine E. As shown in Fig. 1 the shafts 7, 8, and 11 are disposed substantially in alinement with each other and longitudinally of the truck frame 1, whereas the shaft 23 is disposed transversely of said truck frame 1. The universal joints 22 and 24, the latter connecting an attaching head 25 to the shaft 23, provide in effect a flexible shaft so that the height of the engine E above the ground and with respect to the truck frame is immaterial. The positioning of the shaft 23 transversely of the truck frame and to one side thereof allows the apparatus to operate in a relatively small amount of floor space, as shown in Fig. 3.

The attaching head 25 may be either in the form shown in Fig. 4, which illustrates a head adapted to grasp the crank handle H of the engine E, or so constructed that it may be connected directly to the crank shaft when the machine is to be used on engines which normally have no crank handles. To permit these parts to be interchangeable, the head carries a socket for detachable engagement with the square end of a shaft section 23' which projects from the universal connection 24. The head 25, shown in the present drawings, has an arm 26 which is adapted to be disposed parallel to the vertical part of the handle H and secured thereto by a hook 27 positioned at one end, as shown in Fig. 4. The other end of the arm 26 carries the above mentioned socket and is enlarged and provided with a slot 27' for receiving the bend, or that portion of the handle H, which is remote from the hand-engaging portion 28 thereof. A pin 29 extends across the slot 27 after the handle H is in position and retains the same therein.

In the operation of my invention after a new piston or crank shaft has been placed in the engine E, the truck is moved in front of the automobile and disposed transversely thereof, as in Fig. 3. The flexible shaft 23 is next connected by means of the head 25 to the operating crank handle H when the same is used, or to the crank shaft, when no handle is provided. The motor 6 is next started to operate by feeding electricity thereto, so that the shafts 7 and 8 will revolve and cause rotation of the other revoluble parts of the apparatus when the clutch 12 is in use. All the movable parts of the engine E are thus caused to perform their normal functions without the intense heat, which would be generated if such engine was caused to operate under its own power. The operation continues until the operator believes that the frictionally engaging parts of the engine are sufficiently worn to allow said parts 8 to properly operate without stiffness. By such an arrangement, flexibility is procured within a short space of time compared with that required when the parts have to be worked in during the movement of the engine under its own power.

Various changes may be made in the form and proportion of the several parts of the invention without departing from the original principles thereof as hereinbefore outlined.

I claim:—

1. The combination with an engine having a crank at the end of its crank shaft, of a machine for operating said crank shaft, and means for connecting said machine to said crank, said means including an attaching head comprising an arm having one end enlarged and provided with a slot to receive the bend of said crank, said end also having a socket, a hook disposed at the other end of the arm to engage the crank at a point remote from its bend, and a pin disposed across said slot to engage and hold the crank therein, and a shaft section for engagement in said socket.

2. In a machine of the class described, the combination with an engine, of a portable carriage, a rotatable shaft on said carriage, means for revolving said shaft, means for detachably connecting one end of the shaft to the crank shaft of said engine, and a clutch for controlling operation of the shaft.

3. In a machine of the class described, the combination with an engine, of a portable carriage, a rotatable, flexible shaft on said carriage, means for revolving said shaft, means for detachably connecting one end of the shaft to the crank shaft of said engine, and a clutch for controlling operation of the shaft.

4. In a machine of the class described, the combination with an engine, of a portable carriage, a rotatable shaft on said carriage, a second shaft disposed at right angles to the first shaft, an operable connection between the adjacent ends of the shafts, means for attaching one of said shafts to the crank shaft of said engine, and means engaged with the other shaft for rotating the same, said means including a clutch for controlling operation of said shafts.

5. In a machine of the class described, the combination with an engine, of a portable carriage, a rotatable shaft disposed longitudinally of the carriage, a second shaft normally positioned substantially at right angles to the first shaft and transversely of the carriage, an operable connection between the adjacent ends of the shafts, means for rotating said shafts, and a clutch for controlling operation of the shafts.

6. In a machine of the class described, the combination with an engine, of a portable carriage, a rotatable shaft on said carriage, a second rotatable shaft disposed at right angles to the first shaft, a worm on one of said shafts, a worm gear on the other shaft meshing with said worm, a detachable connection between one end of one shaft and the crank shaft of said engine, and means connected with the other shaft for rotating the same, said means including a clutch for controlling rotation of said shafts.

In testimony that I claim the foregoing I have hereunto set my hand at Wausau, in the county of Marathon and State of Wisconsin.

THOMAS H. JACOB.